United States Patent [19]
Williams

[11] 3,848,575
[45] Nov. 19, 1974

[54] SLIDING VANE ROTARY COMBUSTION ENGINE

[76] Inventor: Raymond E. Williams, 15126 Pioneer Blvd., Norwalk, Calif. 90650

[22] Filed: Jan. 26, 1973

[21] Appl. No.: 326,668

[52] U.S. Cl............. 123/8.11, 123/8.09, 123/8.19, 123/8.23, 60/39.61
[51] Int. Cl..................... F02b 53/06, F02b 53/08
[58] Field of Search ....... 123/8.23, 8.09, 8.41, 8.11, 123/8.15, 8.19, 8.25, 8.27, 8.29, 8.31, 8.43; 60/39.61, 39.62; 418/5, 7, 13

[56] References Cited
UNITED STATES PATENTS

| | | | |
|---|---|---|---|
| 1,864,406 | 6/1932 | Christ | 123/8.23 |
| 2,158,532 | 5/1939 | Bullen | 123/8.23 |
| 2,896,409 | 7/1959 | Heiman | 60/39.61 |
| 2,907,307 | 10/1959 | Striegl | 123/8.09 |
| 3,175,360 | 3/1965 | Glenn | 60/39.61 |
| 3,312,202 | 4/1967 | Udelman | 123/84.1 |
| 3,572,030 | 3/1971 | Cuff | 60/39.61 |

*Primary Examiner*—Clarence R. Gordon
*Attorney, Agent, or Firm*—Clarence A. O'Brien; Harvey B. Jacobson

[57] ABSTRACT

A pair of axially spaced generally cylindrical rotor chambers are provided and a pair of generally cylindrical rotors are eccentrically journaled in the chambers for rotation therein in unison and each of the rotors includes a generally rotatable slidable vane. One of the chambers includes a vane swept inlet at a first location spaced on one side of and adjacent the radii of the chambers passing through the axes of rotation of the rotors and the other chamber includes a vane swept outlet spaced on the other side and adjacent the aforementioned radii. A pair of transfer passages including corresponding inlet and outlet ends are provided with their inlet ends opening into the first chamber adjacent the aforementioned radii and on the side thereof remote from the inlet and outlet ends of the passages open into the second chamber adjacent and on the opposite side of the aforementioned radii. Each of the transfer passages includes a fuel injector and the opposite end of the passages are provided with rotary valves driven in timed relation from the rotors. The first chamber functions to draw air in through the intake and to alternately compress air into the transfer passages and the other chamber serves as a combustion and exhaust chamber with the portion of the chamber disposed ahead of the corresponding sliding vane being exhausted and combustion occurring behind the sliding vane.

7 Claims, 8 Drawing Figures

SLIDING VANE ROTARY COMBUSTION ENGINE

The sliding vane rotary combustion engine of the instant invention has been designed to provide an engine whose basic operating characteristics may be incorporated in ignition fired engines as well as diesel type engines. In addition, the rotary combustion engine is constructed in a manner whereby one rotary chamber thereof functions as an air compressor and the other functions as the power developing component, the latter driving the former through a common shaft.

The main object of this invention is to provide a novel rotary engine whose basic structure will enable engines of various sizes and types to be readily produced to satisfy varying power needs.

Another object of this invention is to provide a rotary engine which may be readily modified in order to operate on various fuels including gasoline and diesel oil.

A final object of this invention to be specifically enumerated herein is to provide a sliding vane rotary combustion engine which will conform to conventional forms of manufacture, be of simple construction and easy to maintain so as to provide a device that will be economically feasible, long lasting and relatively trouble free.

These together with other objects and advantages which will become subsequently apparent reside in the details of construction and opertion as more fully hereinafter described and claimed, reference being had to the accompanying drawings forming a part hereof, wherein like numerals refer to like parts throughout.

Figure 1:
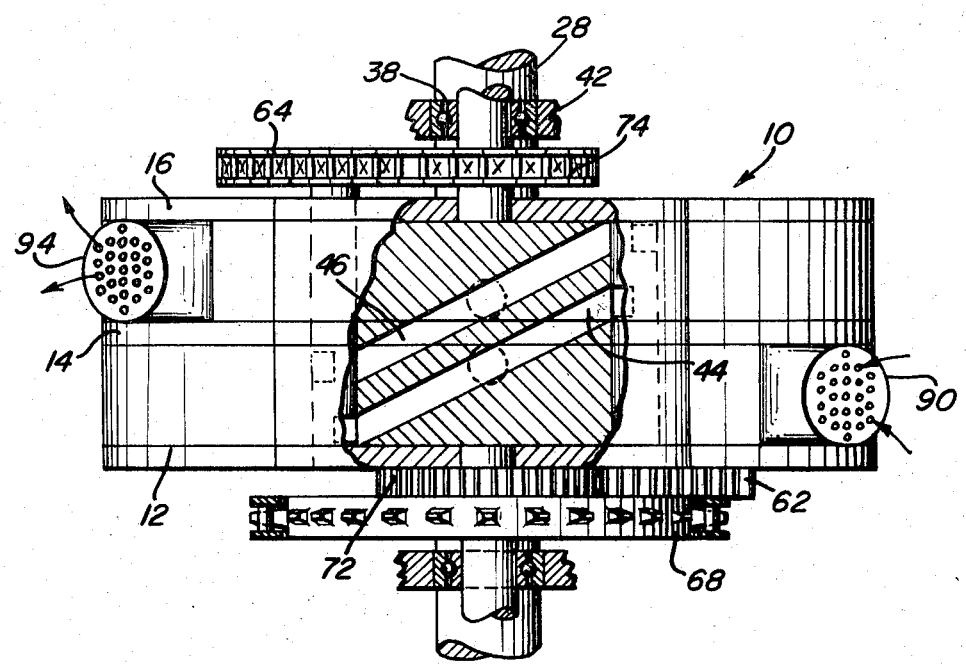
FIG. 1 is a top plan view of the rotary combustion engine of the instant invention with sections of the upper portion thereof being broken away and illustrated in horizontal section to more clearly illustrate the transfer passages of the engine.
Figure 5:
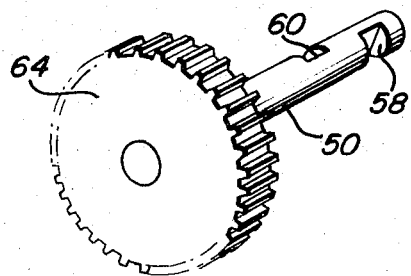
FIG. 5 is a perspective view of one of the rotary valves of the engine.
Figure 6:
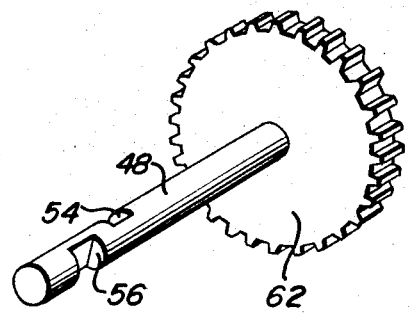
FIG. 6 is a perspective view of the other rotary valve of the engine.

Referring now more specifically to the drawings the numeral 10 generally designates the rotary combustion engine of the instant invention. The engine 10 includes front, intermediate and rear plates 12, 14 and 16 and a pair of chamber bodies 18 and 20 with the body 18 disposed between the plates 12 and 14 and the body 20 disposed between the plates 14 and 16. The plates 12, 14 and 16 include central aligned bores 22, 24 and 26 and a power shaft 28 is journaled through the bores 22, 24 and 26. A pair of similar rotors 30 and 32 and disposed within the chamber bodies 18 and 20 and mounted on the shaft 28 for rotation therewith. Each of the rotors 30 and 32 has a radial slot 34 formed therein and a sliding vane 36 is disposed in each slot 34.

The plates 12, 14 and 16 and the chamber bodies 18 and 20 may be secured together in any convenient manner (not shown). Further, a main timing shaft 34 generally parallels the shaft 28 and is journaled above the main casing of the engine 10 defined by the plates 12, 14 and 16 and the chamber bodies 18 and 20. The shaft 34 is supported by bearing assemblies 36 and 38 carried by supports 40 and 42 and the supports 40 and 42 may be supported from the casing in any convenient manner (not shown).

The upper portion of the casing defines a pair of transfer passages 44 and 46 with corresponding inlet ends opening into the chamber defined by the chamber body 18 and corresponding outlet ends opening into the chamber defined by the chamber body 20. However, a pair of rotary valve member shafts 48 and 50 are journaled longitudinally through the upper portion of the casing at the outlet and inlet ends, respectively, of the transfer passages 44 and 46. The shaft 48 is provided with diametrically opposite and axially spaced notches 54 and 56 registrable with the outlet ends of the transfer passages 44 and 46 and the shaft 50 is provided with axially spaced diametrically opposite notches 58 and 60 registered with the inlet ends of the transfer passages 44 and 46. The notches 54 and 56 are formed in the rear end of the shaft 48 and the front end of the shaft 48 has a gear wheel 62 mounted thereon disposed in front of the front plate 12. The notches 58 and 60 are formed in the front end of the shaft 50 and the rear end of the shaft 50 has a toothed sprocket wheel 64 mounted thereon disposed rearward of the rear plate 16.

The shaft 28 has a drive sprocket wheel 66 mounted thereon aligned with a driven sprocket 68 carried by the front end of the timing shaft 34 and an endless timing chain 70 drivingly couples the sprocket 66 to the sprocket 68. The rear side of the sprocket 68 includes a gear wheel 72 which drives the gear wheel 62 and the rear end of the timing shaft 34 has a sprocket wheel 74 mounted thereon which is aligned with the sprocket wheel 64, a timing chain 76 drivingly connecting the sprocket wheel 74 to the sprocket wheel 64.

The chamber body 18 has a plunger pump-type fuel injector 80 supported therefrom with the outlet nozzle 82 of the injector 80 opening into the transfer passage 44 while similar fuel injector 80 is supported from the casing body 20 and has its outlet nozzle 82 communicated with the transfer passage 46. Each injector 80 includes a check valved fuel inlet 84 and a plunger 86 acted upon by a pair of diametrically opposite lobes 88 on the timing shaft 34 and any suitable means may be provided for supplying liquid fuel to the injectors 80 in the proper quantities.

The chamber body 18 includes an air inlet neck 90 which opens into the chamber 92 defined within the chamber body 18 outwardly of the rotor 30 and the chamber body 20 is provided with an exhaust or outlet neck 94 which opens outwardly of the chamber 96 defined within the chamber body 20 outwardly of the rotor 32.

Figure 2:
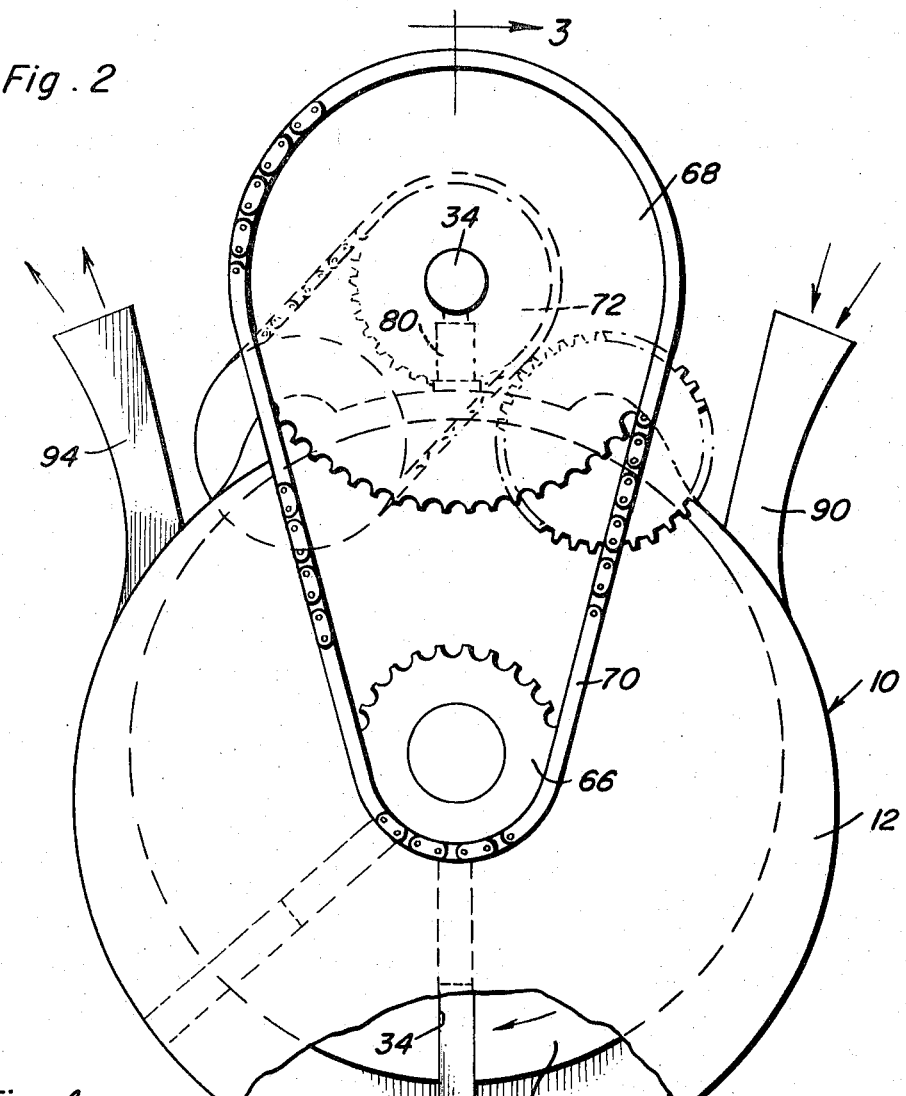
FIG. 2 is a front elevational view of the engine with a lower portion thereof being broken away and illustrated in vertical section.
Figure 4:
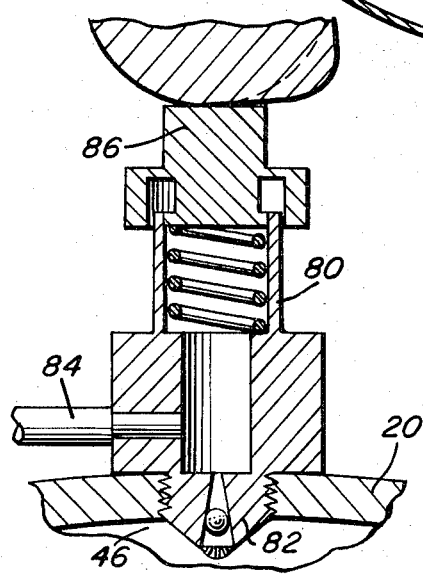
FIG. 4 is an enlarged fragmentary vertical sectional view taken substantially upon the plane indicated by the section line 4—4 of FIG. 3.
Figure 3:
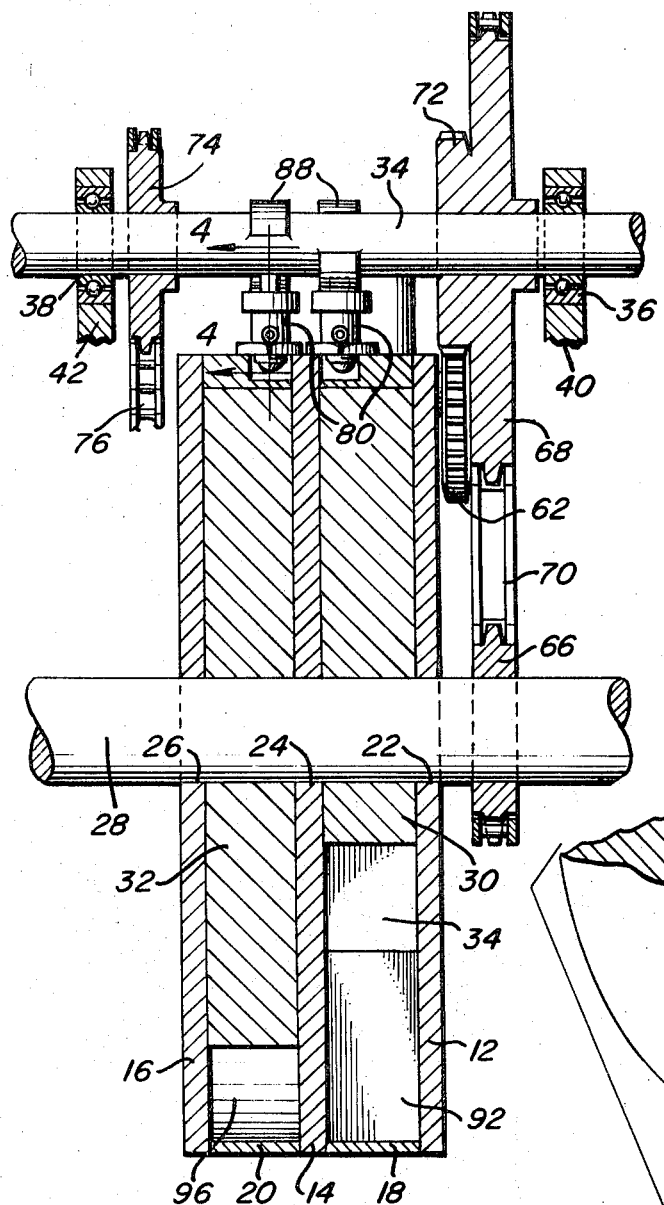
FIG. 3 is a vertical longitudinal sectional view taken substantially upon the plane indicated by the section line 3—3 of FIG. 2.
Figure 7:
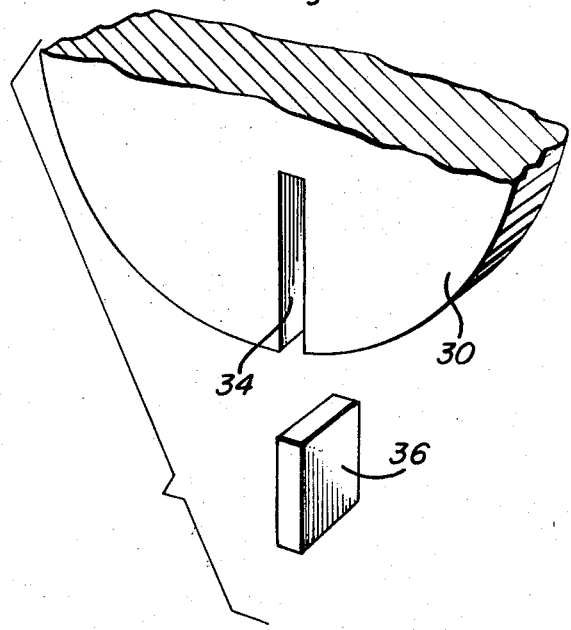
FIG. 7 is a fragmentary exploded perspective view of that portion of one of the rotors of the engine from which the corresponding sliding vane is supported.
Figure 8:
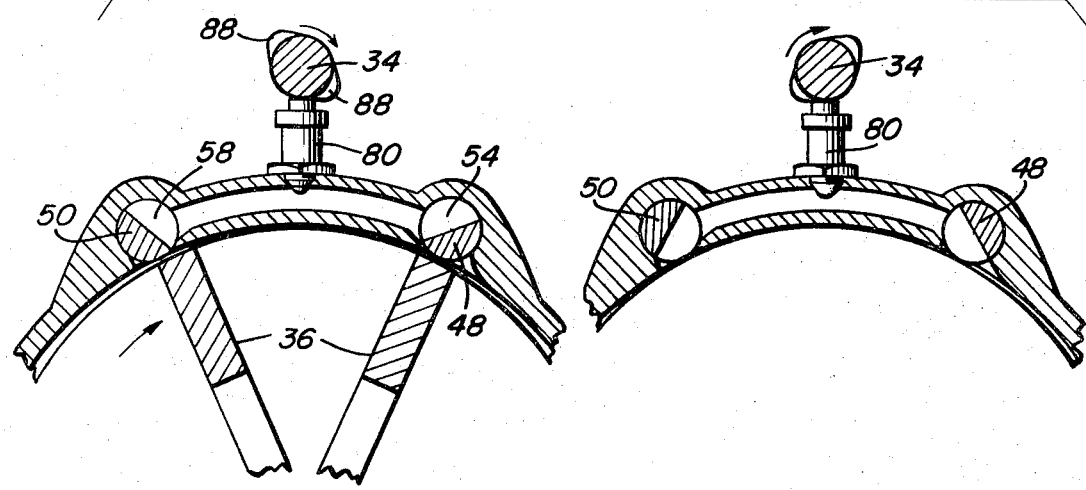
FIG. 8 is a grouping of five schematic views illustrating the operation of the rotary valves and fuel injectors in timed sequence with rotation of the engine rotors.
Figure 8:
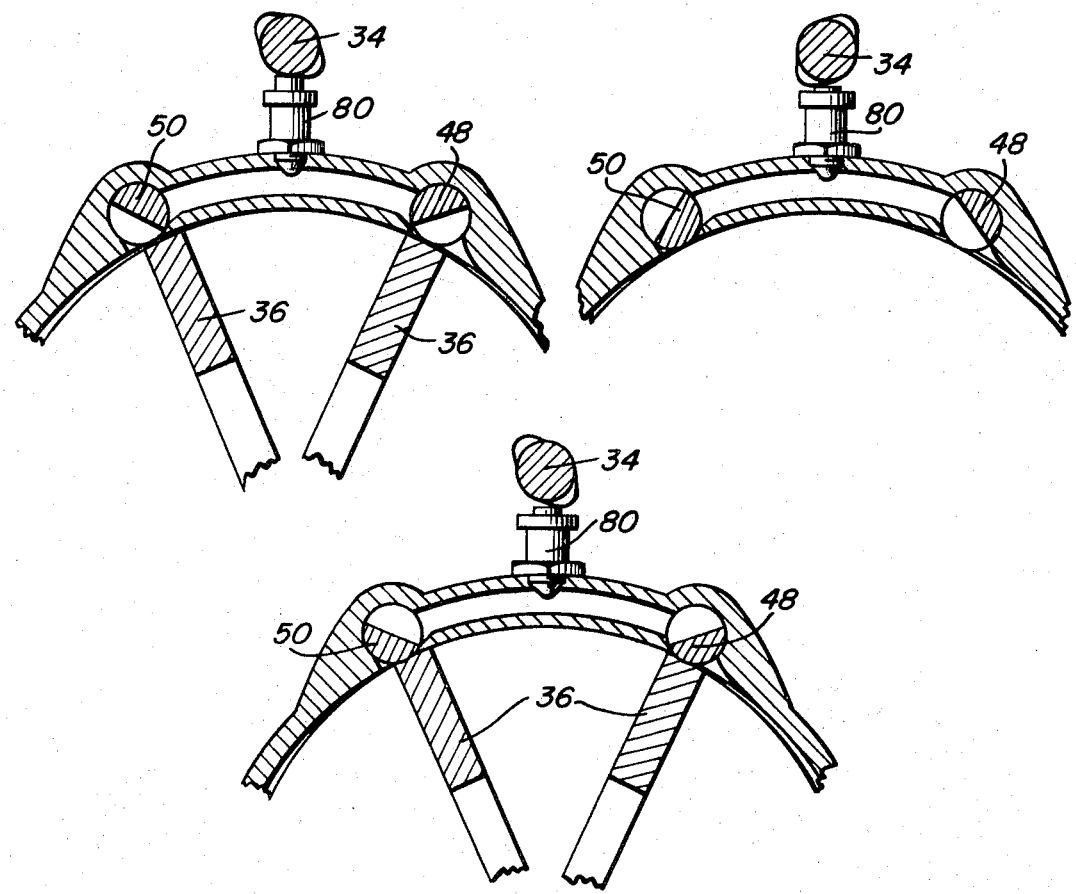

The rotors 30 and 32 rotate in a clockwise direction as viewed in FIG. 2 of the drawings and the vane 36 of the rotor 30 trails the vane 36 of the rotor 32. The vanes 36 are angularly displaced approximately 45 degrees relative to each other. Inasmuch as the rotors 30 and 32 rotate in a clockwise direction, the sprocket 68 also rotates in a clockwise direction as does the valve member shaft 50. However, inasmuch as the valve member shaft 48 is driven by the gear wheels 72 and 62, the valve member shaft 48 rotates in a counterclockwise direction.

It will be noted that the upper peripheral portions of the rotors 30 and 32 enjoy no more than the minimum possible clearance with the uppermost portions of the chambers 92 and 96. If it is desired, the chamber bodies 18 and 20 may be provided with compression seals at their uppermost extremities for sealing engagement with the upper peripheral portions of the rotors 30 and 32. Accordingly, when the notch 58 is disposed so as to open the inlet end of the transfer passage 44, the vane 36 of the rotor 30 swinging through the lower portion of the chamber 92 will be functioning to pump air into the transfer passage 44, the notch 54 of the shaft 48 being out of registry with the outlet end of the transfer passage 44 so that the entire swept volume of the chamber 92 may be displaced into the transfer passage 44 under extremely high pressure. Then, as the vane 36 of the rotor 30 sweeps past the inlet end of the transfer passage 44 the notch 58 will move out of registry with the inlet end of the transfer passage 44. At this time, the vane 36 carried by the rotor 32 has just moved past the outlet end of the transfer passage 44 and the notch 54 is moving in registry with the outlet end of the transfer passage 44 so as to open the latter. Still further, as the inlet and outlet ends of the transfer passage 44 are being closed and opened, respectively, one of the lobes 88 of the shaft 34 engages the plunger 86 of the fuel injector 80 communicated with the transfer passage 44 so as to inject atomized fuel into the transfer passage 44. The heat of compression within the transfer passage 44 will of course ignite the air and fuel mixture as the outlet end of the transfer passage 44 is being opened. This will allow the expanding gases to exit from the outlet end of the transfer passage 44 behind the leading vane 36 carried by the rotor 32 and the pressure of the expanding combustion gases will exert a thrust upon the vane of the rotor 32 so as to drive the latter in a clockwise direction.

As the expanding gases behind the vane of the rotor 32 drive the latter in a clockwise direction the gases in front of the vane of the rotor 32 are being exhausted through the outlet neck 94.

As the vane of the rotor 32 swings slightly past the three o'clock position, the trailing vane 36 of the rotor 30 sweeps past the inlet 90 thereby again compressing the air in front of the vane carried by the rotor 30 and drawing fresh air into the chamber 92 behind the vane of the rotor 30. Inasmuch as the shafts 34, 48 and 50 are driven at one-half the speed of the shaft 28, the next time the vane of the rotor 30 is registered with the shaft 50 the notch 60 thereon will close the inlet end of the transfer passage 46 and the notch 56 of the shaft 48 will open the outlet end of the transfer passage 46. Meanwhile, the transfer passage 44 remains closed at its opposite ends until the next revolution of the rotor 30 is completed and the vane 36 carried by the rotor 30 registers with the shaft 50 for the third time. Of course, each time the vanes 36 are registered with the shafts 48 and 50 one of the lobes 88 depresses the corresponding plunger 86 to deliver the proper amount of atomized liquid fuel into the corresponding transfer passage.

Inasmuch as the chamber 92 and 96 need not be of the same diameter and the rotors 30 and 32 need not be of the same diameter, it is believed apparent that any desired compression ratio within the transfer passages 44 and 46 may be obtained and that the swept volume of the working chamber 96 may be varied accordingly. In addition, still further volumetric ratios of the chamber 92 and 96 may be provided by varying the axial extent of the chambers 92 and 96 and the rotors 30 and 32.

As disclosed, the engine 10 is capable of functioning as a diesel. However, if lower compression ratios within the transfer passages 44 and 46 are desired spark plugs may be operatively associated with the transfer passages 44 and 46 actuated by a distributor driven from the shaft 28.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A rotary engine comprising casing means defining a pair of generally cylindrical chambers, a pair of generally cylindrical rotors journalled from said casing means in said chambers, said rotors being smaller in diameter than said chambers and eccentrically disposed therein with the peripheries of said rotors disposed in closely spaced relation with predetermined peripheral areas of said chambers so as to define a single crescent shaped working zone in each chamber, means coupling said rotors for rotation together, each of said rotors being equipped with a single generally radially slidable vane for sweeping the working zone of the corresponding chamber, said casing means including intake means opening into the working zone of one chamber on the departure side of the corresponding peripheral area and outlet means opening into the working zone of the other chamber on the approach side of the corresponding peripheral area, said engine including a pair of transfer passages including inlet ends opening into the working zone of said one chamber on the approach side of the corresponding peripheral area and outlet ends opening into the working zone of the other chamber on the departure side of the corresponding peripheral area, the vane of the rotor disposed in said other chamber being advanced relative to the vane of the rotor disposed in said one chamber, in its approach toward the corresponding peripheral area, and a pair of rotary valve structures driven at one half rotor speed operatively associated with the inlet and outlet ends of said transfer passages operative to alternately open and close the inlet and outlet ends of said passages, one of said valve structures being operative to generally inversely open and close the intake ends of said passages and the other of said rotary valve structures being operative to generally inversely open and close the outlet ends of said passages each revolution of said rotors, and rotor driven liquid fuel injection means operative to alternately inject liquid fuel into said transfer passages.

2. The combination of claim 1 wherein said chambers are disposed in side-by-side axially aligned relation, said rotors being mounted on a common shaft journalled through said chambers.

3. The combination of claim 1 wherein said inlet ends of said passages are disposed in side-by-side axially spaced relation and said outlet ends are also disposed in side-by-side axially spaced relation.

4. The combination of claim 3 where said transfer passages are disposed in parallel planes inclined between twenty and sixty degrees relative to a plane normal to the axis of rotation of said rotors.

5. The combination of claim 4 wherein said fuel injection means includes a rotor driven cam shaft paralleling the axis of rotation of said rotors and fuel injector pumps spaced along said cam shaft and communicated with the mid-portions of said transfer passages.

6. The combination of claim 5 wherein said valve structures are journalled from said casing means for rotation about axes paralleling the axis of rotation of said rotors.

7. The combination of claim 6 wherein said chambers are disposed in side-by-side axially aligned rotation, said rotors being mounted on a common shaft journalled through said chambers.

* * * * *